Sept. 17, 1957  R. V. LANGMUIR  2,806,955
MASS SPECTROMETER
Filed May 11, 1946

Inventor:
Robert V. Langmuir,
by Harry E. Dunham
His Attorney.

United States Patent Office 2,806,955
Patented Sept. 17, 1957

2,806,955

MASS SPECTROMETER

Robert V. Langmuir, Schenectady, N. Y., assignor to General Electric Company, a corporation of New York Application May 11, 1946, Serial No. 669,044

20 Claims. (Cl. 250—41.9)

The present invention provides an apparatus and a method for detecting and measuring the relative concentrations of different components of a gaseous mixture.

Heretofore, mass spectrometers have been constructed to cause acceleration in a given direction by an electric field of positive ions which were caused to be formed in a gas under investigation, the ions of materially unlike mass-to-charge ratio being caused to be spread out by a magnetic field as distinct ion beams. These beams were directed through small linearly displaced slits in a diaphragm upon collector electrodes in order to measure the relative values of the ion concentrations.

In the mass spectrometer of my present invention certain spatial limitations inherent in such prior constructions are avoided. The ions to be detected in a gaseous mixture to be examined are given cyclic spiral acceleration by a uniform alternating electric field in the presence of a magnetic field, the electric field oriented at right angles to the magnetic field. At a resonant frequency, depending on the relation of the driving frequency to the natural frequency of the ions, the ions are caused to reach a collector electrode. Ions which do not assume a resonant acceleration, due to their charge-to-mass ratios being too small or too great, do not reach the collector electrode and may be removed from the discharge space.

The novel features of my invention will be pointed out with greater particularity in connection with the accompanying drawing and in the appended claims.

Figure 1:
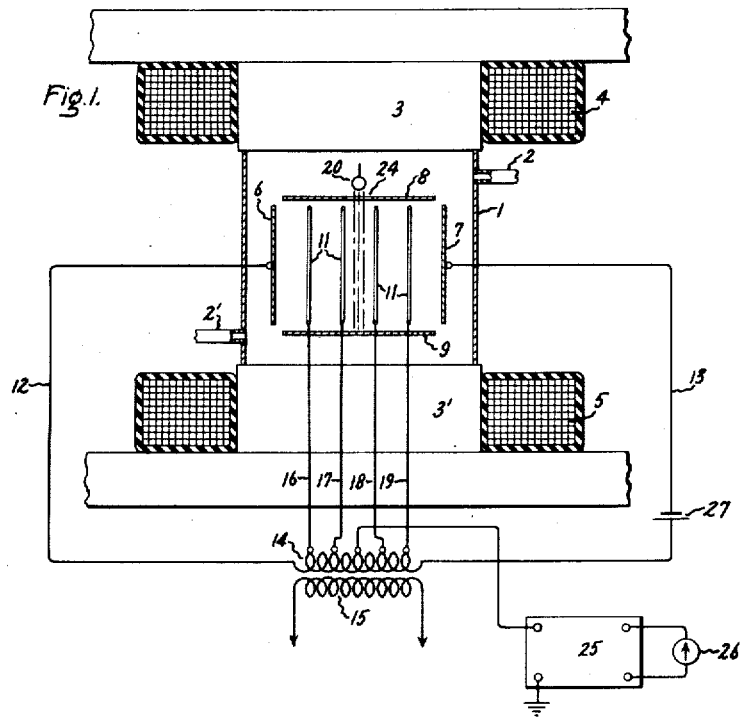
Figure 2:
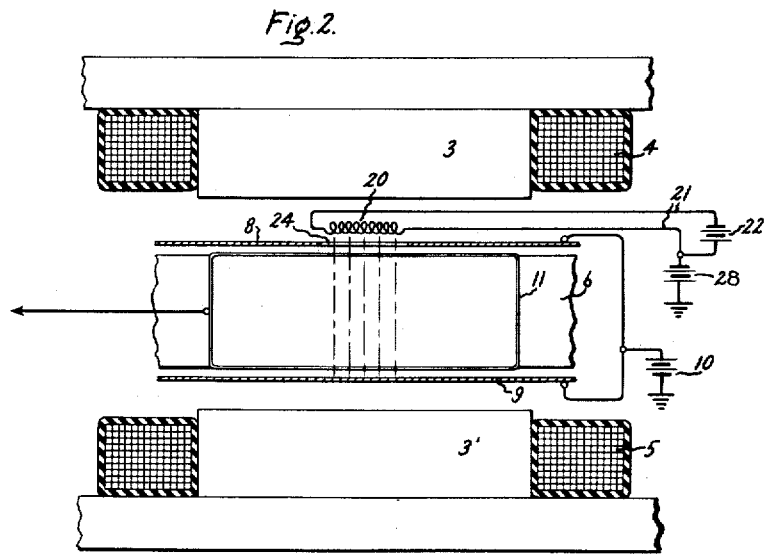

The drawing, which consists of Figs. 1 and 2, shows two convenient section views of an apparatus embodying my invention. Circuit connections to the apparatus are shown in diagrammatic fashion.

Fig. 1 comprises a sealed container 1 having inlet and outlet conduits 2, 2' bounded on opposite sides by magnetic poles 3, 3', the magnetizing windings of which are respectively indicated at 4, 5. Substantially at right angles to the magnetic poles spaced collector plates 6, 7 are provided for impressing a high frequency alternating electric field on ions formed in the enclosed space as will be described.

As a relatively appreciable time is needed to collect the resonant ions (five milliseconds in an example given below) and as the thermal velocities of molecules are of the order of 500 millimeters per millisecond, it follows that the component of thermal velocity in the direction of the magnetic field could remove the ions from the useful region between the plates 6, 7 before they are collected. To prevent this from happening end plates 8, 9 are placed at the top and bottom of the spectrometer. These plates are charged by the potential source 10 (Fig. 2) with a small D. C. potential, which may be as small as one volt. The D. C. field which leaks through the grids 11 (Fig. 1) will repel the positive ions back into the middle of the chamber in the enclosure 1. The grids 11 which consist of spaced conductors shown in the form of a loop (Fig. 2) may be at substantially ground potential, or may be connected to a suitable potential intermediate the potential of the plates 6, 7 will be indicated presently. The electric field between the plates 6, 7 will be at right angles to the magnetic field. The plates 6, 7 are connected by the conductors 12, 13 to the terminals of the secondary winding 14 of a transformer, the primary winding 15 of which is connected to a suitable radio frequency alternating source (not shown).

The grid wires 11 may be used as dividers of potential by connecting them by conductors 16, 17, 18 and 19 to points of intermediate potential on the transformer secondary 14, thereby producing a uniform radio frequency field between the plates 6, 7.

An electron discharge may be caused to traverse a gas or a gaseous mixture in the chamber 1, the discharge passing between a thermionic cathode 20 and the plate 9. The cathode 20, as shown in Fig. 2 is connected to a heating circuit 21 containing a source of electric current diagrammatically represented by the battery 22. A source of potential 28 of about 100 volts is connected between the cathode 20 and ground. Electrons from the cathode 20 pass through the opening indicated at 24 in the top plate 8 to the bottom plate 9 as indicated by the dotted lines. Since the voltage of source 10 may be relatively small, the electrons fall through a potential difference of nearly 100 volts, are accelerated thereby, and ionize by bombardment the gas present in chamber 1. With an alternating electric field impressed between the electrodes 6 and 7 the motion of the positive ions in the container 1 is the resultant of the driving frequency and the frequency characteristic of the charge-to-mass ratio of the ions, i. e., the natural frequency of the ions. As shown hereinafter a frequency of the order of 10 to 500 kilocycles may be used. The magnetic field may be of the order of a few thousand gauss.

Non-resonant ions should be slowly removed from the influence of the high frequency electric field of the spectrometer. If not removed, they may drift to the discharge plates 6 and 7, thereby adding a confusing backround reading, or they may build up an undesired space charge. Such undesired positive ions may be removed by adding by adding D. C. voltage between the two plates 6 and 7, which will gradually sweep out the undesired positive ions in a direction perpendicular to both the electrical and magnetic fields. Low voltage, for example about 0.1 volt will be sufficient to remove these undesired positive ions. A low voltage source is shown at 27 in Fig. 1.

The motion of the ions can be explained by the following theory which considers the motion of a positive ion in crossed electric and magnetic fields. Assuming the electric field be only in a y direction and assuming it to vary sinusoidally with time, and assuming the magnetic field be uniform in a z direction, then the equations of motion of the ions are:

$$m\frac{d^2x}{dt^2} = eH\frac{dy}{dt}$$

$$m\frac{d^2y}{dt^2} = eE_y - eH\frac{dx}{dt}$$

$$E_y = E \cos(\omega T + \phi)$$

$x, y$ = coordinates of ion at time $t$
$m$ = mass of ion
$e$ = charge of ion
$H$ = magnetic field in gauss ($z$ direction only)
$E_y$ = electric gradient in $y$ direction only
$t$ = time Using the initial conditions that the ion starts at the origin with zero velocity—i. e. at $t=0$, $$x = y = \frac{dx}{dt} = \frac{dy}{dt} = 0$$

the solution of the equations of motion for $y$ is:

$$y = \frac{eE}{m(\gamma^2 - \omega^2)} [\cos(\omega t + \phi) - A \cos(\gamma t + \psi)]$$

where $$\gamma = \frac{eH}{m}$$

$$A = \left[1 + \frac{\omega^2}{\gamma^2} \tan^2 \phi\right]^{1/2} \cos \phi$$

$$\psi = \tan^{-1}\left(\frac{\omega}{\gamma} \tan \phi\right)$$

at resonance ($\omega = \gamma$) the solution is $$y = \frac{eEt}{2m\omega} \sin(\omega t + \phi)$$

The resonant frequency in kilocycles, if the mass is expressed in mass units and H in gauss, is: $f = 1.53\, H/m$.

It is seen in the non-resonant case that the maximum excursion of an ion in the $y$ direction is limited to a certain value depending on the electric and magnetic fields applied. However, at resonance the $y$ displacement of an ion can increase without limit. Thus by choosing the relation of electric and magnetic fields properly, ions of a certain charge-to-mass ratio will be collected by the plates 6 and 7 but the ions of other charge-to-mass ratio will not be collected.

The resultant D. C. current due to the ions collected by the plates 6 and 7 can be amplified by a D. C. amplifier 25 and indicated by the meter 26.

It can be shown that the resolving power of the instrument (ability to collect ions of mass $m$ but not of mass $m \pm \Delta m$) is $$\frac{m}{\Delta m} = \frac{y_m H^2}{9 \times 10^4 E m}$$

where:

$\Delta m$ = difference in mass of two ions which can be just separated.
$m$ = mass in mass units (oxygen = 16).
$E$ = peak R. F. gradient in volts/cm.
$H$ = magnetic field in gauss.
$y_m$ = ½ the distance between the R. F. plates in centimeters.

It is seen that if constant resolving power is used, E must be proportional to $1/m$. If maximum possible sensitivity at all masses is desired ($\Delta m = 1$), E varies as $1/m^2$, which gives just sufficient resolving power to separate ions differing in mass by 1 mass unit.

A typical mass spectrometer of this type would have the following characteristics:

1. Distance between R. F. plates = 4 cm.
2. R. P. = $10^2$ at mass 50.
3. H = 2000 gauss.
4. V = .02 volt/cm.
5. Number of cycles to collect an ion of mass 50 = 315.
6. Length = about 10 cm.
7. Electron beam, forming ions—several milliamperes, at 100 volts.
8. Resonant frequency = 60 kc. for mass 50.

What I claim as new and desire to secure by Letters Patent of the United States is:

1. A mass spectrometer comprising the combination of an envelope providing a closed space to which gases may be admitted, means for ionizing said admitted gases, means for generating a magnetic field which traverses said space, means including electrodes in said space for generating an alternating electric field oriented to be normal to said magnetic field and having a frequency of alternation corresponding to the natural frequency of ions possessing a certain mass whereby said ions may be accelerated in spiral paths and ultimately impinge upon said electrodes, grid conductors within said space connected to maintain a desired alternating electric field distribution, means for indicating the discharge upon said electrodes of ions which impinge thereupon, and means for removing from said space ions which possess natural frequencies other than that corresponding to the frequency of said electric field.

2. The method of selectively determining the components of a gaseous mixture which comprises ionizing said gaseous mixture in an enclosed space, impressing a unidirectional magnetic field upon said ionized mixture, simultaneously impressing an alternating electric field upon said ionized mixture in a direction substantially normal to said magnetic field, directing and retaining the mixture of ions within the mutual confines of said magnetic and electric fields, causing the frequency of said electric field to be synchronized with respect to the natural frequency of ions possessing a given mass to cause such ions to be selectively accelerated in spiral paths of continually increasing radii, and collecting said selectively accelerated ions as they attain a predetermined radii.

3. The method of selectively determining the components of gases which comprises ionizing said gases in an enclosed space to produce ions having various mass-to-charge ratios, impressing a unidirectional magnetic field upon said ions, simultaneously impressing an alternating electric field upon said ions in a direction substantially normal to said magnetic field, causing the frequency of said electric field to be synchronized with respect to the natural frequency of ions possessing a certain mass-to-charge ratio whereby such ions may be selectively accelerated in spiral paths of increasing radii, directing and retaining said ions having a certain mass-to-charge ratio within the mutual confines of said magnetic and electric fields, and collecting said selectively accelerated ions as they attain predetermined radii.

4. The method of selectively determining the components of gases which comprises ionizing said gases in an enclosed space to produce ions having various mass-to-charge ratios, impressing a unidirectional magnetic field upon said ions, simultaneously impressing an alternating electric field upon said ions in a direction substantially normal to said magnetic field, causing the frequency of said electric field to be synchronized with respect to the natural frequency of ions possessing a certain mass-to-charge ratio whereby such ions may be selectively accelerated in spiral paths of increasing radii, directing and retaining said ions having a certain mass-to-charge ratio within the mutual confines of said magnetic and electric fields, removing from the mutual confines of said magnetic and electric fields ions having mass-to-charge ratios other than said certain ratio, and collecting said selectively accelerated ions as they attain predetermined radii.

5. In apparatus for accelerating ions of a certain mass in spiral paths of increasing radii to detect the components of gases, an envelope defining a space into which the gases are admitted, means for ionizing said admitted gases, magnetic means for generating a magnetic field which traverses said space and said spiral paths, means for generating an alternating electric field throughout the portion of said space provided for said spiral ion paths including opposed electrodes between which said electric field is established, said electric field being oriented to be substantially normal to said magnetic field and having a frequency of alternation corresponding to the natural frequency of ions possessing a certain mass whereby such ions are accelerated in said spiral paths within the confines of said electric field, and conducting means disposed in said envelope at the ultimate radii of said accelerated ions for collecting said accelerated ions.

6. In apparatus for accelerating ions of a certain mass in spiral paths of increasing radii to detect the components og gases, an envelope defining a space into which the gases are admitted, means for ionizing said admitted gases, magnetic means for generating a unidirectional magnetic field which traverses said space and said spiral paths, means for generating an alternating electric field throughout the portion of said space provided for said spiral paths including opposed electrodes between which said electric field is established substantially normal to said magnetic field, the combined effect of said magnetic and electric fields being such that ions within the mutual confines of both fields and having a natural frequency corresponding to the frequency of the alternating electric field are accelerated in said spiral paths of increasing radii while ions having other natural frequencies are accelerated only to limited radii, and conducting means disposed in said envelope so as to collect said first mentioned ions.

7. A mass spectrometer comprising the combination of an envelope providing a closed space to which gases may be admitted, means for ionizing said admitted gases, means for generating a magnetic field which traverses said space, means including electrodes in said space for generating an alternating electric field oriented to be normal to said magnetic field and having a frequency of alternation corresponding to the natural frequency of ions possessing a certain mass whereby said ions may be accelerated in spiral paths and ultimately impinge upon said electrodes, and spaced conductors within said space connected to maintain a desired alternating electric field distribution.

8. A mass spectometer comprising the combination of an envelope providing a closed space to which gases may be admitted, means for ionizing said admitted gases, means for generating a magnetic field which traverses said space, means including electrodes in said space for generating an alternating electric field oriented to be normal to said magnetic field and having a frequency of alternation corresponding to the natural frequency of ions possessing a certain mass whereby said ions may be accelerated in spiral paths and ultimately impinge upon said electrodes, spaced conductors within said space connected to maintain a desired alternating electric field distribution, and means for indicating the discharge upon said electrodes of ions which impinge thereupon.

9. In apparatus for accelerating ions of a certain mass in spiral paths of increasing radii to detect the components of gases, an envelope defining a space into which the gases are admitted, means for ionizing said admitted gases, magnetic means for generating a magnetic field which traverse said space and said spiral paths, means for generating an alternating electric field throughout the portion of said space provided for said spiral paths including opposed electrodes between which said electric field is established, said electric field being oriented to be substantially normal to said magnetic field and having a frequency of alternation corresponding to the natural frequency of ions possessing a certain mass whereby such ions are accelerated in said spiral paths within said electric field, and further opposed electrodes within said space connected to establish an electric field for retaining said accelerated ions within said alternating electric field.

10. In apparatus for accelerating ions of a certain mass in spiral paths of increasing radii to detect the components of gases, an envelope defining a space into which the gases are admitted, means for ionizing said admitted gases, magnetic means for generating a magnetic field which traverses said space and said spiral paths, means for generating an alternating electric field throughout the portion of said space provided for said spiral paths including opposed electrodes between which said electric field is established, said electric field being oriented to be substantially normal to said magnetic field and having a frequency of alternation corresponding to the natural frequency of ions possessing a certain mass whereby such ions are accelerated in said spiral paths within said electric field, and further opposed electrodes within said space connected to a source of direct current for maintaining said last-named electrodes at a desired potential to prevent said accelerated ions from escaping from said alternating electric field.

11. A mass spectrometer comprising means for generating a magnetic field including a pair of spaced apart pole pieces between which the magnetic field is established; an envelope providing a closed space into which gases may be admitted, said envelope being disposed between said pole pieces; means for ionizing said admitted gases; means including opposed electrodes in said space for generating an alternating electric field oriented to be normal to said magnetic field and having a frequency of alternation corresponding to the natural frequency of ions possessing a certain mass whereby such ions are accelerated in spiral paths within said alternating electric field; and plate electrodes within said space adjacent said first-named electrodes and substantially normal to the axis of said pole pieces, said plate electrodes being connected to establish an electric field for retaining said accelerated ions within said alternating electric field.

12. A mass spectrometer comprising means for generating a magnetic field including a pair of spaced apart pole pieces between which the magnetic field is established; an envelope providing a closed space into which gases may be admitted, said envelope being disposed between said pole pieces; means for ionizing said admitted gases; means including two plate electrodes in said closed space for generating an alternating electric field oriented to be normal to said magnetic field and having a frequency of alternation corresponding to the natural frequency of ions possessing a certain mass whereby such ions are accelerated in spiral paths within said alternating electric field, said plate electrodes being spaced apart and disposed substantially at right angles to said pole pieces; and means for retaining said accelerated ions within said alternating electric field including two plate electrodes in said closed space disposed substantially at right angles to the axis of said pole pieces and to said first-named plate electrodes, said last-named plate electrodes being connected to a source of direct current to maintain said last-named plate electrodes at a desired potential.

13. A mass spectrometer comprising means for generating a magnetic field including a pair of spaced apart pole pieces between which the magnetic field is established; an envelope providing a closed space into which gases may be admitted, said envelope being disposed between said pole pieces; means for ionizing said admitted gases; means including two plate electrodes in said closed space for generating an alternating electric field oriented to be normal to said magnetic field and having a frequency of alternation corresponding to the natural frequency of ions possessing a certain mass whereby such ions are accelerated in spiral paths within said electric field, said plate electrodes being spaced apart and disposed substantially at right angles to said pole pieces; and spaced loop conductors within said closed spaced disposed substantially parallel to said plate electrodes and connected to maintain a desired alternating electric field distribution.

14. A mass spectrometer comprising means for generating a magnetic field including a pair of spaced apart pole pieces between which the magnetic field is established; an envelope providing a closed space into which gases may be admitted, said envelope being disposed between said pole pieces; means for ionizing said admitted gases; means including two plate electrodes in said closed space for generating an alternating electric field oriented to be normal to said magnetic field and having a frequency of alternation corresponding to the natural frequency of ions possessing a certain mass whereby such ions are accelerated in spiral paths within said electric field, said plate electrodes being spaced apart and disposed substantially at right angles to said pole pieces; spaced loop conductors within said closed space disposed substantially parallel to said plate electrodes and connected to maintain a desired alternating electric field distribution; and means for retaining said accelerated ions within said alternating electric field including two plate electrodes in said closed space disposed substantially at right angles to the axis of said pole pieces and to said first-named plate electrodes, said last-named electrodes being outside the space enclosed by said loop conductors and connected to a source of direct current to maintain said last-named electrodes at a desired potential.

15. A mass spectrometer comprising means for generating a magnetic field including a pair of spaced apart pole pieces between which the magnetic field is established; an envelope defining a closed space into which gases may be admitted, said envelope being disposed between said pole pieces; means for ionizing said admitted gases; means including two plate electrodes in said closed space and a source of alternating current connected thereto for generating an alternating electric field oriented to be normal to said magnetic field and having a frequency of alternation corresponding to the natural frequency of ions possessing a certain mass whereby such ions are accelerated in spiral paths of increasing radii while ions having other masses are accelerated only to limited radii, said plate electrodes being spaced apart and disposed substantially at right angles to said pole pieces; means for collecting the accelerated ions having said certain mass; and means for sweeping from the confines of said alternating electric field the ions having said other masses including a source of direct current connected in series with said source of alternating current.

16. A mass spectrometer comprising means for generating a magnetic field including a pair of spaced apart pole prices between which the magnetic field is established; an envelope defining a closed space into which gases may be admitted, said envelope being disposed between said pole pieces; means for ionizing said admitted gases; means including two plate electrodes in said closed space and a source of alternating current connected thereto for generating an alternating electric field oriented to be normal to said magnetic field and having a frequency of alternation corresponding to the natural frequency of ions possessing a certain mass whereby such ions are accelerated in spiral paths of increasing radii while ions having other masses are accelerated only to limited radii, said plate electrodes being spaced apart and disposed substantially at right angles to said pole pieces; means for collecting the accelerated ions having said certain mass; means for sweeping from the confines of said alternating electric field the ions having said other masses including a source of direct current connected in series with said source of alternating current; means for collecting said accelerated ions having said certain mass; means for retaining said accelerated ions having said certain mass within said alternating electric field including two plate electrodes in said closed space disposed substantially at right angles to the axis of said pole pieces and to said first-mentioned plate electrodes, said last-named plate electrodes being connected to a source of direct current to maintain said last-named plate electrodes at a desired potential.

17. A mass spectrometer comprising means for generating a magnetic field including a pair of spaced apart pole pieces between which the magnetic field is established; an envelope providing a closed spaced into which gases may be admitted, said envelope being disposed between said pole pieces; means for ionizing said admitted gases; means including two plate electrodes in said closed space for generating an alternating electric field oriented to be normal to said magnetic field and having a frequency of alternation corresponding to the natural frequency of ions possessing a certain mass whereby such ions are accelerated in spiral paths within said alternating electric field, said plate electrodes being spaced apart and disposed substantially parallel to a plane including the axis of said pole pieces; and further spaced apart electrodes within the said space including two plate electrodes disposed substantially at right angles to the axis of said pole pieces and to said first- named plate electrodes, said last-named plate electrodes being connected to a source of direct current.

18. A mass spectrometer comprising the combination of an envelope providing a closed space to which gases may be admitted, means for ionizing said admitted gases, means for generating a magnetic field which traverses said space, means including electrodes in said space for generating an alternating electrode field oriented to be normal to said magnetic field and having a frequency of alternation corresponding to the natural frequency of ions possessing a certain mass whereby said ions may be accelerated in spiral paths, grid conductors within said space connected to maintain a desired alternating electric field distribution, electrode means dsposed in said space in the path of ions of said certain mass, means for indicating the discharge upon said electrode means of ions which impinge thereupon, and means for removing from said space ions which possess natural frequencies other than that corresponding to the frequency of said electric field.

19. In mass spectrometry involving the formation of ions and the separation thereof in a magnetic field, the improvement which comprises simultaneously subjecting the ions to the magnetic field and to an alternating electrical field oriented to be normal to the magnetic field and having a frequency of alternation corresponding to the natural frequency of ions possessing a certain mass whereby said ions may be accelerated in spiral paths, selectively collecting said ions of certain mass, and separately removing from the field the ions which possess natural frequencies other than that corresponding to the frequency of the electric field.

20. In mass spectrometry involving the formation of ions of a gas sample and the separation thereof in a magnetic field, the improvement which comprises forming the ions by subjecting the gas sample to an electron beam, introducing the ions into the magnetic field and simultaneously subjecting them to an alternating electric field oriented to be normal to the magnetic field and having a frequency of alternation corresponding to the natural frequency of ions possessing a certain mass whereby the ions of said certain mass are accelerated in spiral paths, selectively collecting and discharging the ions of certain mass, measuring the current produced by such selective discharge of the ions of said certain mass, and selectively removing from the field ions which possess natural frequencies other than that corresponding to the frequency of the electric field.

References Cited in the file of this patent

UNITED STATES PATENTS

| | | |
|---|---|---|
| 1,948,384 | Lawrence | Feb. 20, 1934 |
| 2,370,673 | Langmuir | Mar. 6, 1945 |
| 2,373,151 | Taylor | Apr. 10, 1945 |
| 2,627,034 | Washburn | Jan. 27, 1953 |

UNITED STATES PATENT OFFICE

CERTIFICATE OF CORRECTION

Patent No. 2,806,955

September 17, 1957

Robert V. Langmuir

It is hereby certified that error appears in the printed specification of the above numbered patent requiring correction and that the said Letters Patent should read as corrected below.

Column 5, line 26, for "spectometer" read -- spectrometer --; line 46, for "traverse" read -- traverses --; column 6, line 54, for "spaced", second occurrence, read -- space --; column 7, line 31, for "prices" read -- pieces --; column 8, line 19, for "electrode" read -- electric --.

Signed and sealed this 19th day of November 1957.

SEAL)

.ttest:

ARL H. AXLINE ttesting Officer

ROBERT C. WATSON
Commissioner of Patents